Nov. 25, 1952    H. W. CARDWELL ET AL    2,619,212
CLUTCH OR BRAKE WITH FLEXIBLE BACKING DISKS
Filed March 10, 1948      2 SHEETS—SHEET 2
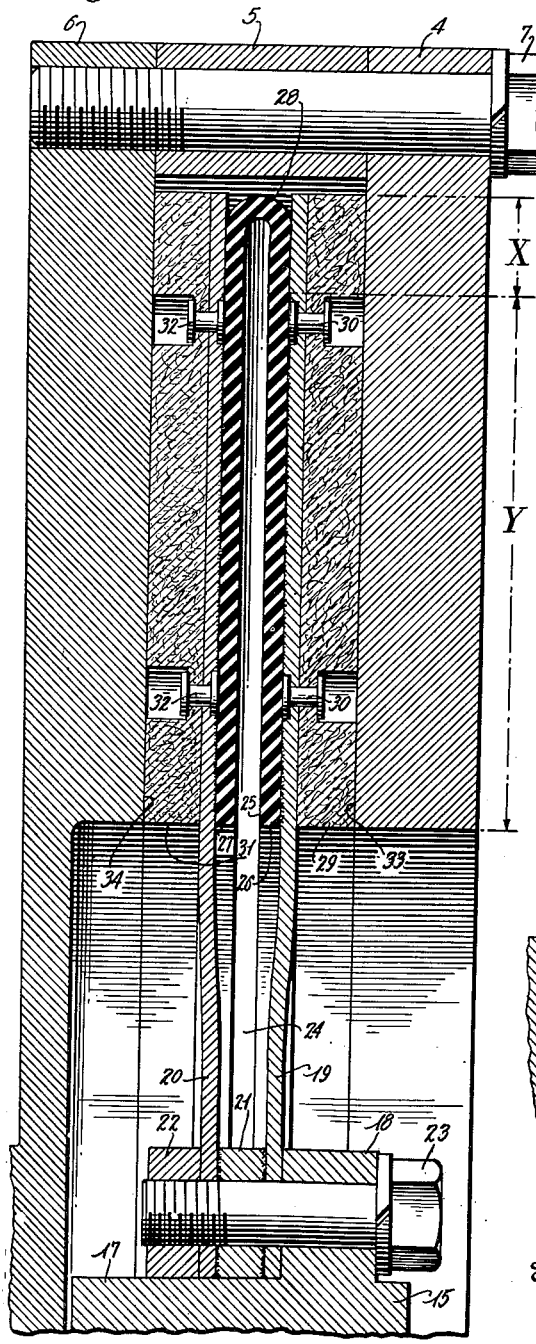
Inventors
Harland W. Cardwell and
Earl R. Johnson
By Bacon + Thomas
Attorneys Patented Nov. 25, 1952

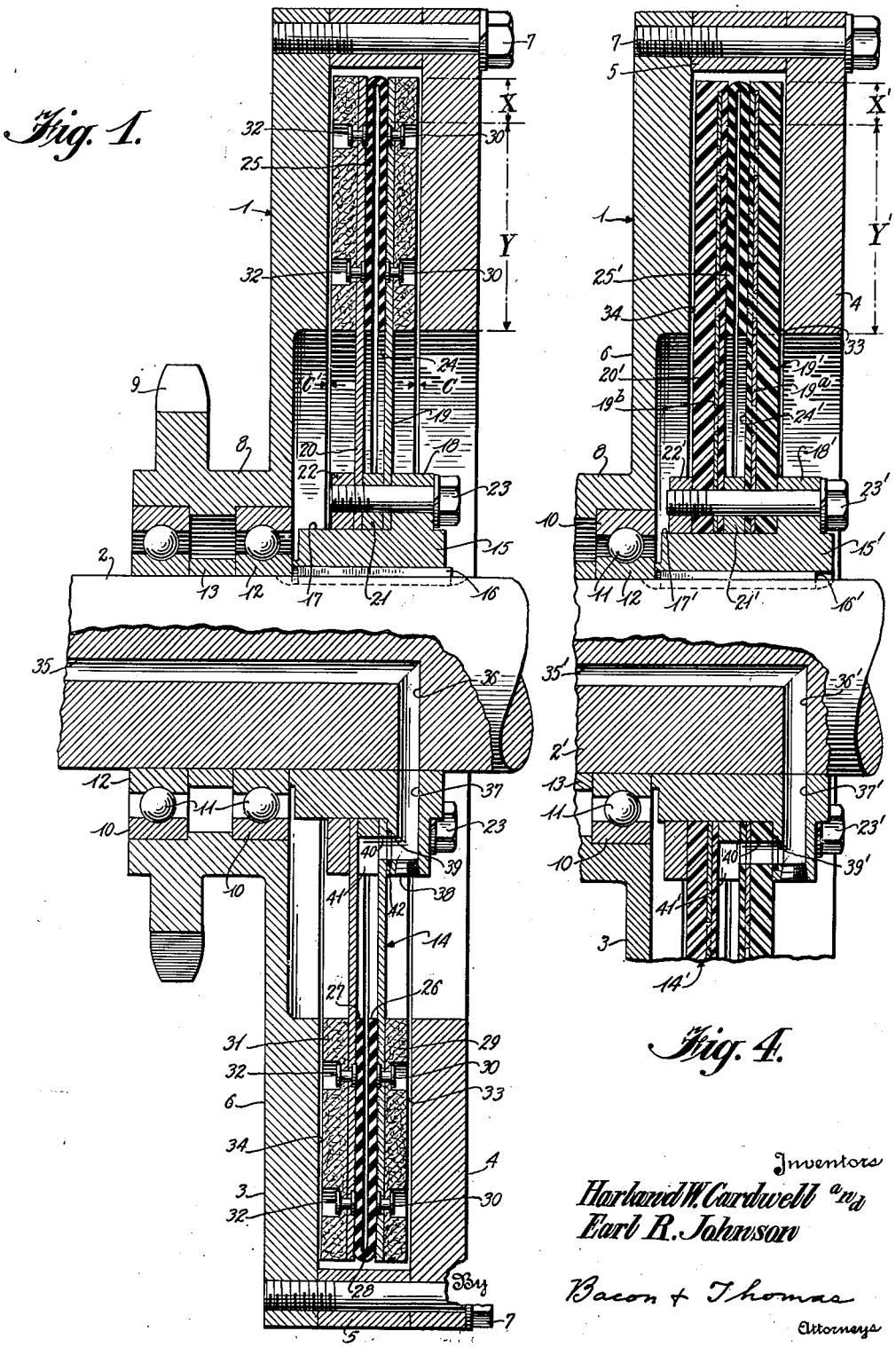

2,619,212

UNITED STATES PATENT OFFICE 2,619,212

CLUTCH OR BRAKE WITH FLEXIBLE BACKING DISKS

Harland W. Cardwell and Earl R. Johnson, Wichita, Kans., assignors to Cardwell Manufacturing Company, Inc., Wichita, Kans.

Application March 10, 1948, Serial No. 14,136

12 Claims. (Cl. 192—88)

This invention relates to clutches and brakes, and more particularly to friction clutches and brakes operated by fluid pressure, preferably air under pressure.

The invention further relates to a novel friction plate assembly including resilient metallic backing discs carrying friction elements suitable for use in either clutches or brakes, the backing discs being spaced apart and tightly clamped together at their inner portions and having an annular, folded diaphragm disposed therebetween and bonded thereto at limited areas to provide an expansible pressure chamber for fluid effective to flex the outer portions of the backing discs apart.

The invention still further relates to a novel friction plate assembly including flexible, air-impervious backing discs of molded asbestos-phenolic friction material or the like, suitably reinforced with steel or fabric.

The principal object of the invention is to provide a clutch and/or brake construction having backing discs for the friction elements which are strong enough to transmit or oppose heavy torque loads, but nevertheless are sufficiently elastic or resilient to bend and allow the outer portions thereof to be flexed apart in an axial direction so that the friction elements carried thereby can engage with cooperating driving or driven plates upon the application of fluid pressure thereto, and which backing discs are adapted to return to their initial positions to disengage the friction elements upon release of said pressure.

Another object of the invention is to provide a clutch and/or brake construction similar to that described above, but in which the friction material itself serves as a flexible backing disc and provides a friction surface for engaging with the cooperating driving or driven plates.

Another object of the invention is to provide a clutch and/or brake structure of the expansible type in which the pressure chamber for the operating fluid is provided by a minimum number of parts that can be readily assembled.

A further object of the invention is to provide an assembly of a diaphragm and backing discs carrying friction elements which will operate to automatically compensate for wear and maintain effective engagement of the friction elements throughout their useful life.

Other objects and features of the invention will be apparent from the following description taken in conjunction with the accompanying drawings, in which:

Fig. 1 is a longitudinal sectional view through a structure embodying the resilient backing discs and diaphragm assembly of the present invention, the structure being associated with a housing in such manner that it is adapted to be used either as a clutch or brake, and the backing discs being shown in their unflexed position with clearance between the friction material carried thereby and the adjacent friction surfaces of the housing;

Fig. 2 is an enlarged fragmentary sectional view illustrating the resilient backing discs slightly flexed apart to effect engagement of the friction elements with the adjacent friction surfaces of the housing;

Fig. 3 is a sectional view similar to Fig. 2, but illustrating the manner in which the resilient backing discs and diaphragm flex to engage the friction elements with the friction surfaces of the housing, even after substantial wear of the friction elements has occurred; and Fig. 4 is a fragmentary sectional view of a clutch or brake including a modified form of friction plate assembly.

Referring now to Fig. 1, the clutch or brake structure illustrated therein is generally identified by the numeral 1, and is shown in association with a shaft 2. The shaft 2 may be either a drive shaft or a driven shaft, or it may be held stationary, depending upon the purpose that the structure is intended to serve. The clutch or brake 1 includes a housing 3 embodying an annular end plate 4, a spacer ring 5, and a second end plate 6, the plates 4 and 6 and the spacer ring 5 being secured together in assembled relation by a series of cap screws 7. The plate 6 has a central hub portion 8 carrying a sprocket 9. The central hub portion 8 is suitably bored to receive the outer races 10 of a pair of ball bearings 11, the inner races 12 of said ball bearings being mounted upon the shaft 2 and being separated by a spacer 13. When the shaft 2 is utilized as a drive shaft, then the sprocket 9, of course, will be driven. The sprocket 9 will serve as a driver when the shaft 2 is employed as a driven shaft. On the other hand, if the shaft 2 is held stationary, it will oppose relative rotation of the housing 3 and sprocket 9.

A connection is established between the shaft 2 and the housing 3 through a friction plate assembly 14 carried by a mounting member 15 secured in non-rotatable relation to the shaft 2 by a conventional key 16. The mounting member 15 has an outer cylindrical portion 17 extending along the length thereof from one end and terminating at the base of an outwardly extending flange 18. A pair of resilient, flat, steel backing discs or pressure plates 19 and 20 is snugly fitted upon the cylindrical portion 17 of the mounting member 15, and a metallic spacer ring 21 is disposed between said plates. The backing discs 19 and 20 are preferably made of tempered spring steel conforming to the American Iron and Steel Institute designation C-1090. However, the invention is not limited to the use of the particular steel specified and other suitable materials may obviously be employed, for example, if greater durability is required, the backing discs 19 and 20 may be made of tool steel, although the C-1090 steel is quite satisfactory for most commercial requirements.

The outer side of the backing disc 19 abuts the adjacent face of the flange 18 and a suitable gasket material (not shown) is disposed between the inner face of said backing disc and the adjacent face of the spacer ring 21. Gasket material is also interposed between the opposite face of the spacer ring 21 and the inner face of the backing disc 20. A clamping ring 22 is also mounted upon the cylindrical portion 17 and engages the outer face of the backing disc 20. A plurality of cap screws 23 extends through suitable openings in the flange 18 of the mounting member 15, through aligned openings in the backing disc 19, spacer 21, backing disc 20, and are threaded into openings in the clamping ring 22 for clamping the inner margins of the backing discs together in fluid-tight relation with the spacer 21, and for securely mounting said backing discs upon the mounting member 15. The spacer 21 thus provides an annular chamber 24 between the backing discs 19 and 20 and also serves as a closure for the inner portion of said chamber. The outer portion of the chamber 24 is effectively closed by a folded, annular, fabric-reinforced rubber diaphragm 25, including side portions 26 and 27 joined by a fold portion 28, with the fold portion 28 disposed adjacent the periphery of the backing discs 19 and 20. The diaphragm 25 thus presents a transverse cross-section which is generally U-shaped, and wherein the fold portion 28 constitutes the base of the U and the side portions 26 and 27 the legs.

The sides or legs 26 and 27 of the diaphragm 25 are respectively cemented or otherwise adhesively bonded to the inner faces of the backing discs 19 and 20, respectively, throughout an annular area indicated by the radial dimension Y; the sides or legs 26 and 27 being unbonded or free from the backing discs 19 and 20 throughout the annular area defined by the radial dimension X.

The backing disc 19 has an annular friction element 29 secured thereto by countersunk rivets 30 having heads flush with the inner surface of said backing disc, and the backing disc 20 has a similar annular friction element 31 secured thereto by countersunk rivets 32. Normally, the friction element 29 is spaced from the inner friction surface 33 of the plate 4 by a clearance indicated by the dimension C, and the friction element 31 is similarly spaced from the inner friction surface 34 of the plate 6 a distance equal to the dimension C', as indicated in Fig. 1. It will also be noted from Fig. 1 that the friction elements 29 and 31 are carried by the backing discs 19 and 20, respectively, on the outer side thereof, and are disposed in the zone or region between the friction surfaces 33 and 34 of the plates 4 and 6, respectively. It will also be noted that the annular friction elements 29 and 31 have a radial dimension substantially equal to that of the friction surfaces 33 and 34, respectively, with which they engage.

It will be understood that in assembling the device, the friction elements 29 and 31 are riveted to the backing discs 19 and 20 before the spacer 21 is inserted between said discs, and that the spacer 21 is positioned between said discs prior to the bonding of the side portions 26 and 27 of the diaphragm 25 to said discs. It will be further noted that the radial dimension of the diaphragm 25 is substantially the same as the radial dimension of the friction elements 29 and 31.

The shaft 2 has an axial passageway 35 which communicates at one end with an air supply conduit (not shown) and at its other end with a radial passageway 36. The mounting member 15 has a passageway 37 which communicates at one end with the passageway 35 and is closed at its opposite end by a conventional plug 38. A lateral passageway 39 in the mounting member 15 communicates with an opening 40 in the backing plate 19, and the spacer ring 21 is cut away at 41 in the region of the passageway 40 to establish communication with the pressure chamber 24. Any leakage of air between the flange 18 and the backing plate 19 in the region of the passageways 39 and 40 is prevented by a packing ring 42 mounted in a suitable recess in said flange.

The steel backing discs 19 and 20 are normally flat and assume a position in which the clearances C and C' exist between the friction elements 29 and 31 carried thereby and the plates 4 and 6, respectively, as shown in Fig. 1. However, upon the introduction of air under pressure through the passageways 35, 36, 37, 39, 40 and the recess 41 into the pressure chamber 24 under the control of a valve (not shown), the air acts on the inner surfaces of the backing discs 19 and 20 and on the inner surfaces of the legs 26 and 27 of the diaphragm 25 in a manner tending to move the backing discs 19 and 20 apart. Thus, the backing disc 19 is flexed toward the plate 4 so that the outer face of the friction element 29 carried thereby engages the friction surface 33 of said plate; and the backing disc 20 is simultaneously flexed toward the plate 6 so that the outer face of the friction element 31 carried thereby engages the friction surface 34 of the plate 6. In other words, the backing discs 19 and 20 are flexed substantially equal amounts in opposite directions, and in a manner such that the friction elements 29 and 31 engage the plates 4 and 6 substantially flush for the full radial width of said friction elements, all as will be apparent from Fig. 2.

Upon engagement of the friction elements 29 and 31 with the plates 4 and 6, respectively, as aforedescribed, driving torque will be transmitted between the sprocket 9 and the shaft 2, with either the shaft 2 or the sprocket 9 functioning as a driver when the device is used as a clutch. When the device is used as a brake, and if the shaft 2 is held stationary, relative rotation of the sprocket 9 will be opposed through coaction of the housing 3 and the friction elements 29 and 31.

Upon operation of the air control valve (not shown) to effect the exhaust of air from the pressure chamber 24, the spring backing discs 19 and 20 will inherently assume their original flat positions disengaging the friction elements 29 and 31 carried thereby from the plates 4 and 6, respectively, so that the housing 3 is then free of said friction elements.

Fig. 3 illustrates the manner in which frictional contact is maintained between the friction elements 29 and 31 and the plates 4 and 6, respectively, even after said friction elements have become greatly worn. It will be apparent that as wear of the friction elements 29 and 31 occurs, the backing discs 19 and 20 will have to be flexed farther apart, and such flexing action is readily permitted by the fact that the diaphragm 25 is unconnected with the backing discs 19 and 20 in the region of the fold 28, or, in other words, is unbonded to said backing discs throughout the zone X, or beyond the outer limit of the dimension Y. This in effect provides "slack" in the diaphragm 25 at the fold 28 enabling the backing discs 19 and 20 to be flexed apart without hindrance by said diaphragm and thus compensate for wear of the friction elements 29 and 31. It will also be observed that although the backing discs 19 and 20 are shown substantially farther apart in Fig. 3 than in Fig. 2, the wear on the friction elements 29 and 31 is substantially uniform for the major extent of said friction elements, the friction elements being only slightly thicker at the inner marginal portions thereof than elsewhere.

Fig. 4 is a view of a clutch or brake similar in all respects to that shown in Figs. 1–3, except that it includes a modified form of friction plate assembly 14', the parts of the housing in Fig. 4 having been identified by the same numerals employed in connection with the description of the housing of Fig. 1. The friction plate 14' is carried by a mounting member 15' secured in non-rotatable relation to a shaft 2' by a conventional key 16'. The mounting member 15' has an outer cylindrical portion 17' extending along the length thereof from one end and terminating at the base of an outwardly extending flange 18'. A pair of flexible or resilient, flat, discs 19' and 20' of uniform thickness is snugly fitted upon the cylindrical portion 17' of the mounting member 15' and a metallic or non-metallic spacer ring 21' is disposed between said discs. The backing discs 19' and 20' are made of air impervious, molded asbestos-phenolic friction material, or the like, preferably suitably reinforced with layers of fabric and/or a resilient perforated steel plate 19a and 19b, respectively, embedded therein. The discs 19' and 20', being formed of friction material, thus provide a friction surface for engaging with the cooperating surfaces 33 and 34 of the driving or driven plates 4 and 6. At the same time, the inherent resilience of the material of the discs 19' and 20' is sufficient to enable the same to function as resilient backing discs even in instances where the steel reinforcing plates 19a and 19b are omitted entirely.

The backing discs 19' and 20' are secured to the mounting member 15' in the same manner as the backing discs 19 and 20, namely, by means of a clamping ring 22' and a plurality of cap screws 23'. The spacer 21' provides an annular chamber 24' between the backing discs 19' and 20' and also serves as a closure for the inner portion of said chamber. The outer portion of the chamber 24' is closed by a folded, annular, fabric reinforced rubber diaphragm 25', which is identical to the diaphragm 25, and is similarly bonded to the inner sides of the backing discs 19' and 20' by being cemented thereto through an annular area having a dimension corresponding to the letter Y', the diaphragm 25' being unbonded or free from the backing discs 19' and 20' throughout the annular area defined by the radial dimension X'.

Air under pressure for effecting flexing of the backing discs 19' and 20' to effect engagement thereof with the housing plates 4 and 6 is introduced into the chamber 24' in the same manner as in Fig. 1. Thus, the shaft 2' is provided with passageways 35' and 36' and these communicate with the passageways 37' and 39' in the mounting member 15'. The passageway 39' communicates with an opening 40' in the backing disc 19' and the spacer 21' is cut away at 41' to establish communication with the pressure chamber 24'.

The operation of the device shown in Fig. 4 is similar to that of the device shown in Fig. 1, air under pressure, upon introduction into the chamber 24', causing the outer portions of the backing discs 19' and 20' to be flexed apart to effect engagement of the outer surfaces thereof with the plates 4 and 6 to provide a driving connection between the friction plate assembly 14' and the housing 1. Upon release of the air pressure the backing discs 19' and 20' through their inherent flexibility and resilience return to their initial position with the outer surfaces thereof spaced from the adjacent surfaces 33' and 34' of the housing plates 4 and 6.

While preferred embodiments of the present clutch and brake structure have been illustrated and described herein, it will be understood that changes in the arrangement and details of construction thereof may be made without departing from the spirit of the invention or the scope of the annexed claims.

We claim:

1. A device of the character described, comprising: a housing having friction surfaces therein arranged in spaced confronting relation; a pair of resilient metallic backing discs; means securing the central portions of said backing discs together, said backing discs having outer portions spaced apart and extending into the space between the friction surfaces of said housing; a friction element carried by each of said backing discs disposed on the outer side thereof in the zone of said friction surfaces; an annular rubber diaphragm disposed between said backing discs in the region behind said friction elements, said diaphragm being generally U-shaped in transverse cross-section with the base of the U outermost and having a radial dimension approximately equal to that of said friction elements to provide flat annular sides having the major area thereof secured to the inner side of each of said backing discs to provide a pressure chamber between said backing discs; and means for admitting operating fluid under pressure into said pressure chamber to flex the outer portions of said backing discs apart, whereby to cause the friction elements carried thereby to engage with said friction surfaces of said housing.

2. A device of the character described, comprising: a housing having annular friction surfaces arranged in spaced confronting relation; a pair of resilient metallic backing discs having outer portions extending into the space between said friction surfaces; a spacer ring at the inner portions of said backing discs spacing the major area of said backing discs apart to provide a space therebetween; means securing the spacer ring and the inner portions of said backing discs against separation; an annular friction element carried by each of said backing discs on the outer side thereof in the zone of said friction surfaces; an annular non-metallic diaphragm in the space between said backing discs, said diaphragm being substantially U-shaped in transverse cross-section with the base of the U disposed outermost, said diaphragm having a radial dimension substantially equal to that of said friction elements and having an annular flat side area adheringly secured to the inner face of each of said backing discs to convert said last-mentioned space into a fluid-tight pressure chamber; and means for admitting operating fluid under pressure into said pressure chamber to flex the outer portions of said backing discs apart, whereby to cause the friction elements carried thereby to engage with said friction surfaces of said housing.

3. A device of the character described, comprising: a housing having annular friction surfaces therein arranged in spaced confronting relation; a mounting member; a pair of spring metal backing discs arranged upon said mounting member with a circumferentially continuous spacer ring therebetween at the inner margins thereof, said backing discs having outer portions extending into the space between the friction surfaces of said housing; an annular friction element carried by each of said backing discs on the outer side thereof in the region of said friction surfaces; and pressure fluid operable means in said last-mentioned space having a radial dimension approximately equal to that of said friction elements disposed outwardly of said spacer ring for flexing the outer portions of said backing discs apart, whereby to cause the friction elements carried thereby to engage with said friction surfaces of said housing, said spacer ring having a passage formed therein for admitting operating fluid into said pressure fluid operable means.

4. A device of the character described, comprising: a housing having friction surfaces therein arranged in spaced confronting relation; a pair of spring metal backing discs; a mounting member; means securing said backing discs to said mounting member, said backing discs having outer portions extending into the space between the friction surfaces of said housing; an annular friction element carried by each of said backing discs on the outer side thereof in the region of said friction surfaces; an annular rubber diaphragm between said backing discs, said diaphragm being generally U-shaped in transverse cross-section with the base of the U disposed outermost, said diaphragm having a radial dimension approximately equal to that of said friction elements and having flat annular side areas secured over a substantial portion of the radial extent of said side areas to the inner side of each of said backing discs to provide a fluid-tight pressure chamber between said backing discs; and means for admitting operating fluid under pressure into said pressure chamber to flex the outer portions of said backing discs apart, whereby to cause the friction elements carried thereby to engage with said friction surfaces of said housing.

5. A device of the character described, comprising: a housing having annular friction surfaces therein arranged in spaced confronting relation; a mounting member; a pair of resilient metallic backing discs; means securing the inner portions of said backing discs to said mounting member, said backing discs having outer portions extending into the space between the annular friction surfaces of said housing; an annular friction element carried by each of said backing discs on the outer side thereof in the region of said friction surfaces; a non-metallic diaphragm between said backing discs, said diaphragm having a radial dimension approximately equal to that of said friction elements and including flat annular side portions interconnected by a fold at the outer margin thereof and free from each other at the inner margin thereof, the flat annular side portions of said diaphragm being bonded to the respective inner sides of said backing discs for a major portion of their radial extent, starting at the inner margins of said annular side portions, said diaphragm cooperating with said backing discs to provide an expansible pressure chamber between said backing discs; and means for admitting operating fluid under pressure into said pressure chamber to flex the outer portions of said backing discs apart, whereby to cause the friction elements carried thereby to engage with said friction surfaces of said housing.

6. A friction plate assembly, comprising: a pair of annular resilient backing plates; means at the inner margins of said backing plates spacing said backing plates apart for the major part of the area thereof; means securing said backing plates together in fluid-tight relation at their inner margins, said backing plates having a friction surface on the outer side thereof; a folded annular U-shaped rubber diaphragm having flat sides disposed in the space between said backing plates with its fold outermost and having the major portion of the areas of the flat sides thereof secured to the inner faces of the respective backing plates at a region spaced inwardly from its outer periphery, but being free from said backing plates at the outer marginal areas of the sides of said diaphragm, whereby to provide an expansible pressure chamber between said backing plates; and means for introducing operating fluid under pressure into said pressure chamber to flex the outer portions of said backing plates apart.

7. A friction plate assembly, comprising: a mounting member adapted to be secured to a shaft; a pair of flexible discs secured to said mounting member; a friction surface on each of said discs on the outer side thereof; a folded annular U-shaped diaphragm having flat sides disposed between said discs with its fold outermost and having the major portion of the areas of the flat sides thereof secured to the inner faces of the respective discs at a region spaced inwardly from the outer periphery of said discs, but being free from said discs at the outer marginal areas of said sides, whereby to provide an expansible pressure chamber between said discs; and means communicating with said pressure chamber for introducing operating fluid under pressure into said pressure chamber to flex the sides of said diaphragm and the outer portions of said discs apart.

8. A friction plate assembly, comprising: a member adapted to be mounted upon a shaft, said member having a cylindrical portion and a radial flange at one end of said cylindrical portion; a pair of flexible discs mounted upon said cylindrical portion of said member and having a spacer ring disposed therebetween; means securing the inner marginal portions of said discs and said spacer ring together and to the flange of said mounting member; and an annular non-metallic diaphragm disposed in the space between said discs, said annular diaphragm being substantially U-shaped in transverse cross-section with the base of the U disposed outermost and having flat legs of substantial radial dimension with the outer side of the respective legs thereof bonded through a major portion of their radial length to the adjacent inner surfaces of the discs, to convert the space between said discs into a chamber adapted to receive operating fluid under pressure, at least one of said discs having a passage formed therein for operating fluid, and said spacer having a recess formed therein establishing communication between said passage and said pressure chamber at regions disposed inwardly of the outer periphery of said discs.

9. A friction plate assembly, comprising: a pair of annular backing plates formed of friction material; annular spacer means at the inner margins of said backing plates spacing said backing plates apart for the major part of the area thereof; means securing the inner marginal portions of said backing plates together in fluid-tight relation; a folded annular diaphragm disposed in the space between said backing plates outwardly of said spacer means with its fold outermost and having the inner marginal areas of the sides thereof adheringly secured to the inner faces of the respective backing plates, but being free from said backing plates at the outer marginal areas of the sides of said diaphragm, whereby said diaphragm and spacer means cooperate to provide an expansible fluid-tight pressure chamber between said backing plates; and means for introducing operating fluid under pressure into said pressure chamber to flex the outer portions of said backing plates apart.

10. A friction plate assembly, comprising: a mounting member adapted to be secured to a shaft; a pair of backing discs comprising resilient metal, a separate spacer ring disposed between said backing discs; means securing said backing discs and said spacer ring to said mounting member, each of said backing discs having a friction surface on the outer side thereof; a substantially flat, non-metallic, folded annular diaphragm generally U-shaped in cross-section disposed between said backing discs with its fold outermost and having the major area of the flat sides thereof secured to the inner side faces of the respective backing discs at regions spaced inwardly from the outer periphery of said backing discs, but being free from said backing discs at the outer marginal areas of said sides, whereby to provide an expansible pressure chamber between said backing discs open throughout the entire inner periphery of said diaphragm; and means communicating with said pressure chamber for introducing operating fluid under pressure into said pressure chamber to flex the sides of said diaphragm and the outer portions of said backing discs apart.

11. A friction plate assembly, comprising: a mounting member adapted to be mounted upon a shaft; a pair of discs on said mounting member having spacing means disposed therebetween at the inner marginal portions thereof, said discs being formed of flexible friction material and each having a metallic reinforcing plate embedded therein; means securing said discs to said mounting member; an annular diaphragm disposed in the space between said discs, said annular diaphragm being substantially U-shaped in transverse cross-section and having the outer side of the respective legs thereof bonded through only a portion of their length to the adjacent surfaces of the discs, to convert the space between said discs into a chamber adapted to receive operating fluid under pressure; and means for admitting operating fluid under pressure into said chamber.

12. A device of the character described, comprising: a pair of plates separated by a spacer ring and means securing the plates and spacer ring in assembled relation, said plates having annular friction surfaces arranged in spaced confronting relation; a mounting member arranged concentric with the friction surfaces of said plates, said mounting member having an external cylindrical portion and a radial flange at one end of said cylindrical portion; a pair of resilient discs on the cylindrical portion of said mounting member; a separate spacer ring on said mounting member between said discs and providing a space between said discs, the outer side of one of said discs engaging one side of said radial flange; a clamping ring engaging the outer side of the other of said discs; a plurality of cap screws extending through said flange, discs, spacer and being threaded into said clamping ring for securing said discs upon said mounting member, said discs including outer portions extending into the space between said plates for engagement with said friction surfaces; an annular folded rubber diaphragm disposed outwardly of said spacer ring in the space between said discs, said diaphragm being U-shaped and having the folded portion thereof disposed adjacent the outer marginal edges of said discs and having substantially flat parallel side portions remote from said fold and of substantial radial dimension adheringly bonded to the adjacent inner sides of said discs and cooperating with said spacer ring to provide an expansible pressure chamber between said discs; and means for introducing operating fluid under pressure into said pressure chamber at a point inwardly of the inner periphery of said diaphragm to flex the outer portions of said discs apart and into engagement with said friction surfaces of said plates.

HARLAND W. CARDWELL.
EARL R. JOHNSON.

REFERENCES CITED

The following references are of record in the file of this patent:

UNITED STATES PATENTS

| Number | Name | Date |
|---|---|---|
| 427,085 | Jones | May 6, 1890 |
| 1,048,299 | Dickson | Dec. 24, 1912 |
| 1,482,661 | Scruby et al. | Feb. 5, 1924 |
| 1,698,011 | Chapin | Jan. 8, 1929 |
| 2,074,738 | Aikman et al. | Mar. 23, 1937 |
| 2,251,443 | Fawick | Aug. 5, 1941 |
| 2,254,074 | Klave | Aug. 26, 1941 |
| 2,267,263 | Berger et al. | Dec. 23, 1941 |
| 2,267,650 | Hale | Dec. 23, 1941 |
| 2,354,389 | Lidkea | July 25, 1944 |

FOREIGN PATENTS

| Number | Country | Date |
|---|---|---|
| 1,335 | Great Britain | Jan. 23, 1892 |
| 372,825 | France | Apr. 19, 1907 |